May 2, 1933. H. L. SCHROEDER 1,906,281
BAKER'S PEEL
Filed Sept. 24, 1930
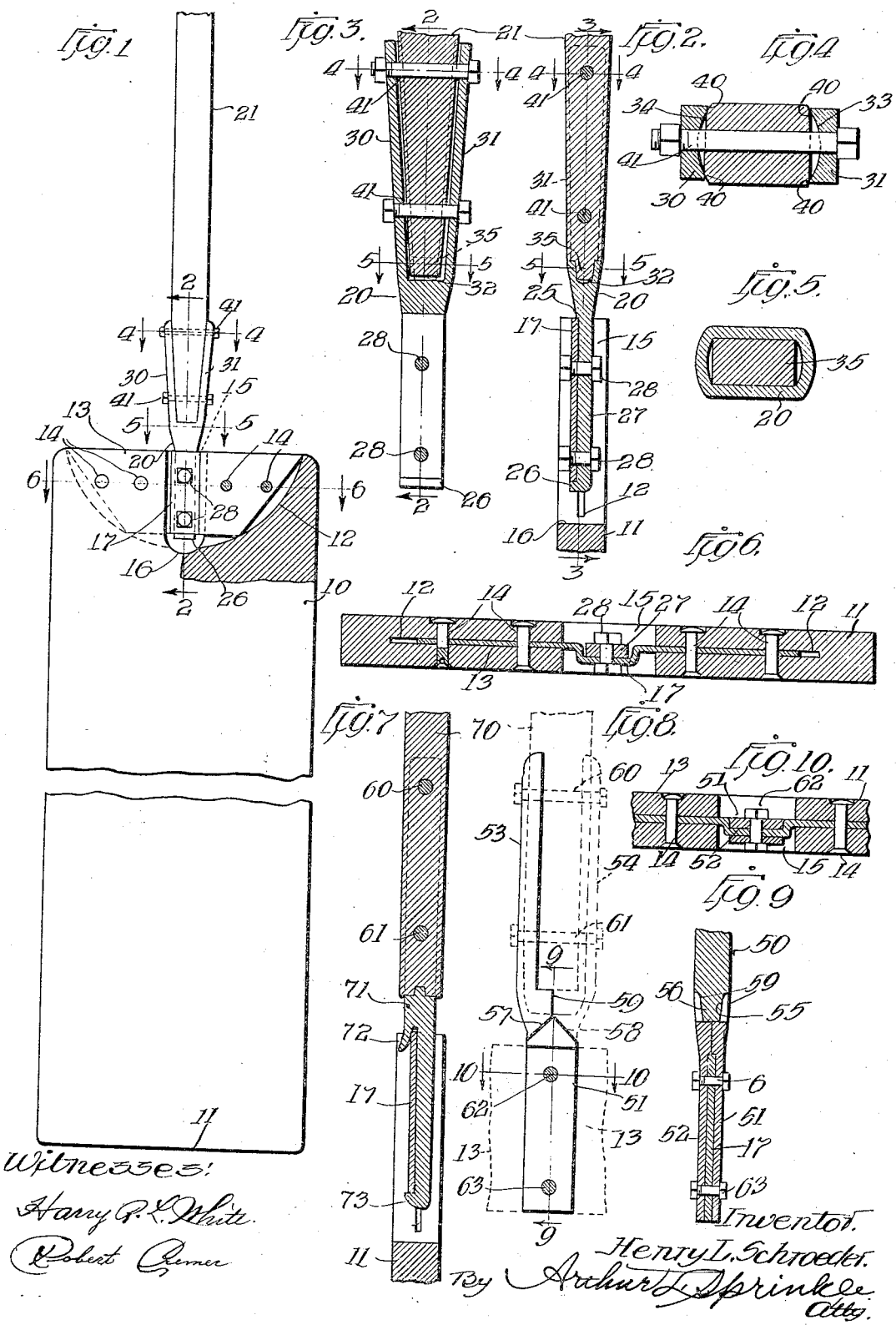

Patented May 2, 1933

1,906,281

UNITED STATES PATENT OFFICE

HENRY L. SCHROEDER, OF CHICAGO, ILLINOIS

BAKER'S PEEL

Application filed September 24, 1930. Serial No. 484,050.

My invention relates to bakers' peels and has for its object to provide improved, simple and efficient means for connecting together the blades and handles of the same.

A further object of the invention is to provide improvements in the construction of detachable metallic connections designed for connecting together the handle and the blade of the bakers' peel which is simple in construction, efficient in use and comparatively inexpensive to manufacture.

Other objects of the invention will appear from the preferred embodiment thereof as described in the following specification, with reference to the drawing forming a part thereof, the novel features being set forth in the appended claims.

In the said drawing,

Fig. 1 is a plan view of a bakers' peel embodying my invention and having a portion of the heel part adjacent the handle connection broken away to show the construction of underlying parts.

Figs. 2 and 3 are longitudinal sectional views of a portion of the bakers' peel including the handle and connections, the view in Fig. 2 being taken on the line 2—2 of Fig. 1, looking in the direction indicated by the arrows and also approximately on the line 2—2 of Fig. 3, while the section in Fig. 3 is taken at right angles to the section Fig. 2 and approximately on the line 3—3 thereof, looking in the direction indicated by the arrows.

Fig. 4 is a detailed, transverse sectional view taken on lines 4—4 of Figs. 1 to 3 inclusive, respectively.

Fig. 5 is an enlarged transverse detailed sectional view on the line 5—5 of Fig. 1, looking in the direction indicated by the arrows, illustrating further the manner of connecting the elongated wood or fiber portion of the handle to the metallic connector.

Fig. 6 is an enlarged, transverse, detailed sectional view on the line 6—6 of Fig. 1, looking in the direction indicated by the arrows.

Fig. 7 is a broken longitudinal sectional view similar to Fig. 2 showing a modified form of detachable handle used in connection with the form of peel blade shown in Fig. 1.

Fig. 8 is a broken, detailed view illustrating a portion of the peel blade of Fig. 1 with a further modified form of handle construction provided with a two-part detachable connector adapted to interchange with the form of handle and connector shown in Figs. 1 to 3 inclusive.

Figs. 9 and 10 are broken longitudinal and transverse sectional views being taken on lines 9—9 and 10—10 respectively of Fig. 8, looking in the direction indicated by the arrows.

Referring more particularly to the drawing, the peel embodied in my invention is made up of a blade 10 of substantially conventional construction, being usually made of wood and substantially rectangular in form. At the heel end, the blade is usually thickest for strengthening purposes and in order that it may function somewhat like a shovel, when introduced into an oven to remove loaves of bread or to facilitate the withdrawal of the blade by retractile movement from beneath loaves in an oven or upon another support the other end of the blade 10, as designated at 11 will be preferably somewhat thinned down according to the usual practice which feature is not shown since it has no bearing upon my invention. The heel of the peel blade is provided with a kerf or slot that is preferably formed by the teeth of a circular saw blade. This kerf or cut is designated by the reference character 12, Figs. 1 and 6, the kerf or cut being substantially parallel with the top and bottom of the surface of the blade 10 at the heel end approximately midway therebetween as illustrated in Fig. 6, the bottom of the kerf or slot therefore being a segment of the circle as illustrated in Fig. 1.

An important feature of my invention resides in the construction of a plate 13 which is formed of metal of substantially the thickness of the slot or kerf 12 so that it may be inserted in the slot and secured therein by suitable pins or rivets 14, which are passed through registering perforations in the heel portion of the peel blade and in the plate 13. While the pins or rivets 14 may take various forms, I prefer to use the form of rivet which is headed, as shown in Fig. 6, the end of the rivet opposite the head being of hollow or tubular form so that it may be readily expanded or upset at the free end to secure these pins or rivets in the wood with both ends thereof slightly embedded in the wood and hence below the normal surface thereof at the heel end of the blade so that the normal wood surface of the peel blade will slide upon the oven surfaces or other surfaces in connecting with which the peel is to be used.

At right angles to the slot 12, at the heel end of the blade beginning at the heel end, I cut a longitudinal slot in the blade that extends from the top to the bottom of the flat sides thereof as indicated in Figs. 1 and 6, and designated by reference character 15. This slot 15 will have parallel sides extending inwardly to the approximate depth of the kerf or cut 12 and when desired at the bottom thereof, it may be rounded, as designated at 16, Fig. 1. In peels constructed with wood blades heretofore, metallic plates somewhat similar to my plate 13 may have been used in connection with longitudinally disposed slots extending inwardly from the heel edge of the blade and reaching from its top to its bottom surfaces, as shown in my prior Patent No. 1,195,510 of August 22, 1916. However, difficulty has been experienced in the use of detachable handles in connection with such peel blades on account of contact of the handle or handle connector with the adjacent wood portions of the peel blade, and it is an important feature of my present invention that I cut the slot 15 extending inwardly from the heel of the peel blade and reaching through from the top to the bottom surface of a width somewhat wider than the metallic connection portion of the handle so that upon insertion of the handle the metallic parts thereon will not depend upon the wood sides of the slot in procuring alignment of the handle. This is accomplished by providing an offset portion in the plate 13, as designated by reference character 17. The metallic plate 13 will preferably be sheared from suitable metal as sheet steel. An economical method of cutting this plate is to shear it so that it will have two longitudinal parallel sides as illustrated in Fig. 1 with two opposed converging edges so that the three shorter sides of the quadrilateral when the plate is inserted in the slot 12 in the manner illustrated in Fig. 1 will form chords of the circle at the bottom of the slot 12 with the respective four corners of the quadrilateral shaped plate substantially in contact with the circular bottom of the slot 12 as shown clearly in Fig. 1. Since the innermost side edge of the plate 13 is a chord of the circular bottom of the slot 12, there will be a portion of the slot 15 near the bottom thereof that will not be intersected by the plate, therefore providing a suitable opening for the hooked end of the metallic connector on the handle, to be presently described. The elongated offset portion 17 at the middle of the plate 13 may be of any desired depth commensurate with the thickness of the metallic connector portion of the handle, but I prefer to offset a sufficient amount as illustrated in Fig. 6, to substantially permit the countersinking of the handle portion in the manner shown, at the same time providing a connection between the metallic connector of the handle and the plate so that suitable headed bolts and nuts may be utilized in making a temporarily permanent but detachable connection between the handle and the peel blade in types of peels where such connection is desired.

I will now describe the construction of the handle and metallic connector for use in connection with a peel blade with a plate 13 and an offset portion 17 as hereinbefore described, the same being designated by the reference character 20 and in the present embodiment being a casting of brass, iron, aluminum or other suitable material, aluminum being preferred for lightness and durability, on account of its heat insulating quality, wood being preferred for the handle portion 21. The metallic connector 20 is preferably formed with a flattened side adapted to lie within the depression or offset portion 17 of the plate 13 in the manner illustrated in Fig. 6, there being a shoulder formed at 25 for co-operating with the outer longitudinal edge of the plate 13 and a slightly hooked projection or shoulder 26 for co-operating with the inner side edge of the plate 13 in the bottom of the slot 15. This will result in a slightly thinned portion or shouldered section 27 on the metallic handle connector which will be perforated to take short threaded bolts 28 with nuts thereon for clamping the metallic connector member of the handle to the offset portion 17, of the plate, the threaded bolts 28 being removable to permit of the further use of the handle with other peel blades when a given peel blade has become worn or injured. With a metallic handle connector of this type it will be seen that the metal parts of the handle will be well interposed between the top and bottom side faces of the peel in the heel end so that the handle will not wear by reason of undue contact with metal parts of the oven in its normal use of introducing bread and removing the same from the oven.

Since wood is the preferred material for use in the body of the handle, it is an important part of my invention that I provide a special and economical construction for securely interlocking and joining together the wood portion of the handle and the metal connector 20. To this end the projecting part of the connector 20 is bifurcated so that there will be two spaced branches 30 and 31 adapted to receive the specially formed cooperating end of the wood handle between them. The connector member 20, Figs. 2 and 3, is slightly enlarged and thickened in the part thereof designed to lie just on the outside of the end of the peel blade, and at the bottom of the slot between the bifurcated branches 30 and 31 I prefer to provide a depression with a bottom portion substantially curved in cross section, as designated by reference character 32, Fig 2. For efficiency and economy in the construction of the wood handle and in assembling the parts, I also prefer to cast the inside and opposite walls of the metallic branches 30 and 31 of the handle so that these walls will be curved as indicated at 33—34, or substantially in the form of segments of a circle. The body portion of the wood handle 21 may be round or oval in cross section or even approaching the rectangular shape with the corners, of course, rounded for the convenience of the operator in grasping the same, and I have provided a metallic connector for the handle which permits of an economical method of shaping the co-operating end of the wood handle so that it may be formed rapidly on automatic machinery with simple operations. When the metallic connector 20 is formed of any of the usual metals, of course, the branches 30—31 will have some flexibility but very little is required in normally assembling the parts, since these branches are shown slightly divergent from the socket opening 32, outwardly, and with the curved inner side walls 33—34 it is an important feature of my invention that the co-operating end of the wood handle 21 may be formed completely rectangular in cross section, decreasing in its cross sectional diameter downward toward the end where it will be formed with a tongue 35 also rectangular in cross section and preferably a drive fit for the opening 32.

By this construction of curved surfaces in the sides of the branches 31—30 and at the bottom of the socket 32, a new and surprising result is obtained in the fitting of the handle 21 to the metallic connection. When the rectangular wedge-shaped wood handle 21 is inserted between the metal branches 30—31 and pressed downwardly toward the socket 32 at the bottom, the fibers of the wood, especially at the corners, will be compressed between the metal in the manner indicated at 40 in Fig. 4 and by pressure or driving at the outer end of the wood handle, the parts will be assembled so that the wood at the corners will be compressed and under pressure from the metal and thus assure a tight fit between wood and metal, which, by reason of the pressure and co-operation of the wood at the corners, will not, due to the effect of the heat or drying, cause the wood to loosen in its fitting on the handle connector. This effect is further produced by reason of the contact at the lower end of the wood handle by the tongue 35 which will present substantially right angle corners to the curved bottom portion 32 whereby such corners will also become flattened and compressed, affording at the forward end of the wood a connection under compression. Furthermore, this construction is economical in that it will admit of some variation in the cutting of the wood handle without the expenditure of labor in trimming and re-shaping the parts due to such normal variations in the manufacture of wood parts of this character. When the wood handle 21 is introduced into the connector between the bifurcated branches 30—31, heretofore described, the parts may be clamped together by the use of suitable headed bolts 41, screw threaded on one end to take suitable clamping nuts.

The peel blade with the improved metal plate 13, having central offset portion 17 may conveniently be used with connecting detachable forms of handles as illustrated, for example, in Fig. 7, where a wood handle 50 is shown secured to a metallic connector 71 having two co-operating projections, one at 72 extending inwardly with a slight downward inclination, while the other at 73 is a downward projection enabling the operator with this type of handle to insert it in the slot formed by the offset portion 17 of the plate, when the peel may be introduced by such connection through the door of an oven or withdrawn therefrom, this connection being obviously a quickly detachable one that may be desirable in some conditions of peel operation.

In Figs. 8, 9 and 10, I show another form of metallic connector for peel handle that will function in connection with the peel blade provided with the offset metallic plate 13 of Figs. 1 and 6, and while this form of handle connection is highly efficient, it is more expensive than the form shown in connection with Figs. 1 to 6 inclusive.

50 is a wood handle of any desired construction, while 51 and 52 are flat metallic members that are adapted to extend on the top and bottom surface of the offset portion 17 of the plate 13, being clamped thereto by suitable bolts 63 being placed through co-operating perforations therein. The metallic connector which is formed by the union of these members 51—52 is similar in construction to the form shown in Figs. 1, 2 and 3, being provided with spaced apart branches 53—54 that are preferably curved on their inner sides in the same manner as the branches 30—31 of the previously described connector. At the bottom of the members 53 and 54, where they are joined in the assembly shown in Fig. 8, there is a socket formed at 55, which is adapted to take the depending wood tongue 56 of the handle 50, just like the tongue 35 on the wood handle shown in Figs. 2 and 5.

Member 53 will be formed so that one of the clamping strips 51 will be integral with it while the member 54 will be integrally attached to the other of the metal clamping members 52, adapted to engage with the top and bottom sides of the plate 13. The body portion of the metallic connector will thus be split or divided in the manner illustrated in Figs. 8 and 9 in two parts, readily separable, the line of division being illustrated by diagonal lines 57 and 58, Fig. 8, and the short longitudinal line 59 shown in Fig. 8. This construction in fact makes the two detachable parts of the metal connector consisting of the handle branches 53 and 54 and the plate branches 51 and 52, substantially duplicates of each other so that one pattern may be used in casting the parts which may be clamped together in pairs, as illustrated in Figs. 8 and 9, by means of the clamping bolts 60—61 in Fig. 8 co-operating with the wood part of the handle and the aforesaid bolts 63 which clamp the connector to the offset portion of the plate 17 of the peel.

I have provided a construction of the peel with a detachable handle of an exceedingly durable, economical and highly efficient type as compared with devices heretofore employed for this purpose.

I claim:

1. A handle attaching device adapted for use in connection with peel blades having metallic handle plates at the rear edge thereof provided with offset handle attaching portions, comprising a handle member adapted to engage a metallic plate of the peel and consisting of a wooden shaft and a metallic connector secured thereto, there being a tapered portion on the said wood handle adapted to co-operate with said metallic connector, said tapered portion being substantially rectangular in cross section, there being a tapered socket on the metallic connector, said socket consisting of two spaced-apart members provided with opposing and inner curved surfaces adapted to engage and compress angular portions formed upon the wood handle.

2. A detachable handle for use with bakers' peels provided with metallic handle connector plates comprising a wood shaft and a connector member secured thereto, the said wood shaft being provided with an extremity of reduced diameter and rectangular in cross section, the said metallic connector being provided with a relatively flat extension being adapted to engage the metallic plate of a peel blade, there being an intermediate body portion in said metallic connector provided with a pair of integrally connected spaced-apart longitudinally extending straps having inner opposing curved surfaces, there being a socket formed in the body portion of the connector between the said spaced-apart straps with a contracted angular shaped bottom portion, the said reduced end of the wood shaft being provided with a tongue of reduced diameter, angular in cross section, for co-operating with the angular bottom portion of said socket, and means for clamping said wood handle member into the socket formed between the spaced members of the connector whereby the said rectangular corner edges of the reduced end of the wood handle including the angular corner edges of the said tongue at the extremities thereof will be flattened and compressed when the said wood shaft and the metallic connector are in assembled relation.

In testimony whereof I have signed my name to this specification, on this 18th day of July, A. D. 1930.

HENRY L. SCHROEDER.